United States Patent
Kumar et al.

(10) Patent No.: US 11,879,411 B2
(45) Date of Patent: Jan. 23, 2024

(54) SYSTEM AND METHOD FOR MITIGATING BOWED ROTOR IN A GAS TURBINE ENGINE

(71) Applicant: General Electric Company, Schenectady, NY (US)

(72) Inventors: Rajesh Kumar, Bengaluru (IN); Prateek Jalan, Bengaluru (IN); Kudum Shinde, Bengaluru (IN); Atanu Saha, Bengaluru (IN); Hiranya Kumar Nath, Bengaluru (IN); Ravindra Shankar Ganiger, Bengaluru (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/838,603

(22) Filed: Jun. 13, 2022

(65) Prior Publication Data
US 2023/0323835 A1     Oct. 12, 2023

(30) Foreign Application Priority Data
Apr. 7, 2022   (IN) .............................. 202211020938

(51) Int. Cl.
*F02K 3/02*     (2006.01)
*F02C 7/12*     (2006.01)

(52) U.S. Cl.
CPC .................. *F02K 3/02* (2013.01); *F02C 7/12* (2013.01); *F05D 2260/20* (2013.01)

(58) Field of Classification Search
CPC ........... F02K 3/02; F02C 7/12; F05D 2260/20
See application file for complete search history.

(56) References Cited

U.S. PATENT DOCUMENTS 2,655,308 A    10/1953   Luttman
2,684,568 A     7/1954   Senger
(Continued)

FOREIGN PATENT DOCUMENTS

EP    0141770 A1    10/1984
EP    2213843 A2     8/2009
(Continued)

OTHER PUBLICATIONS

Diepolder, Design Features and Procedures to Reduce the Phenomenon of HP—Rotor Bow on Jet Engines, 13 Pages. Retrieved on Sep. 23, 2009 from website http://www.mtu.de/en/technologies/engineering_news/development/33949Diepolder-September.pdf.

*Primary Examiner* — Jacob M Amick
*Assistant Examiner* — Charles J Brauch
(74) *Attorney, Agent, or Firm* — Dority & Manning, P.A.

(57) ABSTRACT

A gas turbine engine includes a casing, a rotor assembly rotatably mounted within the casing, the rotor assembly comprising a forward rotor portion defining a forward rotor cavity and an aft rotor portion defining an aft rotor cavity, the aft rotor cavity being fluidly isolated from the forward rotor cavity, and a cooling system. The cooling system includes a forward cooling fluid supply, a forward supply line providing fluid communication between the forward cooling fluid supply and the forward rotor cavity, an aft cooling fluid supply, an aft supply line providing fluid communication between the aft cooling fluid supply and the aft rotor cavity, and a flow control system fluidly coupled to the forward supply line and the aft supply line for regulating a flow of forward cooling fluid and a flow of aft cooling fluid.

19 Claims, 4 Drawing Sheets

(56) References Cited

U.S. PATENT DOCUMENTS

| | | |
|---|---|---|
| 3,641,766 A | 2/1972 | Uehling |
| 4,003,200 A | 1/1977 | Zerlauth |
| 4,291,531 A | 9/1981 | Campbell |
| 4,296,599 A | 10/1981 | Adamson |
| 4,416,111 A | 11/1983 | Lenahan et al. |
| 4,452,037 A | 6/1984 | Waddington et al. |
| 4,462,204 A | 7/1984 | Hull |
| 4,482,293 A | 11/1984 | Perry |
| 4,513,567 A | 4/1985 | Deveau et al. |
| 4,576,547 A | 3/1986 | Weiner et al. |
| 4,653,267 A | 3/1987 | Brodell et al. |
| 4,807,433 A | 2/1989 | Maclin et al. |
| 4,893,984 A | 1/1990 | Davison et al. |
| 5,134,844 A | 8/1992 | Lee et al. |
| 5,205,115 A | 4/1993 | Plemmons et al. |
| 5,219,268 A | 6/1993 | Johnson |
| 5,292,227 A | 3/1994 | Czachor et al. |
| 5,385,012 A | 1/1995 | Rowe |
| 5,439,353 A | 8/1995 | Cook et al. |
| 5,525,032 A | 6/1996 | Kreis et al. |
| 5,605,437 A | 2/1997 | Meylan |
| 5,685,693 A | 11/1997 | Sexton et al. |
| 5,689,948 A | 11/1997 | Frutschi |
| 5,965,240 A | 10/1999 | Blackburn et al. |
| 6,132,857 A | 10/2000 | Campenois et al. |
| 6,141,951 A | 11/2000 | Krukoski et al. |
| 6,190,127 B1 | 2/2001 | Schmidt |
| 6,422,807 B1 | 7/2002 | Leach et al. |
| 6,498,978 B2 | 12/2002 | Leamy et al. |
| 6,575,699 B1 | 6/2003 | Jones |
| 6,910,852 B2 | 6/2005 | Simeone et al. |
| 6,978,622 B2 | 12/2005 | Dittmann et al. |
| 7,329,084 B2 | 2/2008 | Dittmann et al. |
| 7,434,402 B2 | 10/2008 | Paprotna et al. |
| 7,510,778 B2 | 3/2009 | Bernard et al. |
| 7,708,518 B2 | 5/2010 | Chehab |
| 7,744,346 B2 | 6/2010 | Schreiber et al. |
| 7,752,847 B2 | 7/2010 | Ceric et al. |
| 7,766,610 B2 | 8/2010 | Busekros et al. |
| 7,780,410 B2 | 8/2010 | Kray et al. |
| 7,780,420 B1 | 8/2010 | Matheny |
| 7,785,063 B2 | 8/2010 | McQuiggan et al. |
| 7,798,767 B2 | 9/2010 | Kondo et al. |
| 7,805,839 B2 | 10/2010 | Cammer |
| 8,038,382 B2 | 10/2011 | Nigmatulin et al. |
| 8,061,971 B2 | 11/2011 | Roush et al. |
| 8,137,073 B2 | 3/2012 | Guisti et al. |
| 8,177,503 B2 | 5/2012 | Bintz et al. |
| 8,186,933 B2 | 5/2012 | Doss et al. |
| 8,210,801 B2 | 7/2012 | Ballard, Jr. et al. |
| 8,240,975 B1 | 8/2012 | Ryznic |
| 8,257,017 B2 | 9/2012 | Down et al. |
| 8,296,037 B2 | 10/2012 | Plunkett et al. |
| 8,776,530 B2 | 7/2014 | Shirooni et al. |
| 8,789,376 B2 | 7/2014 | Coffinberry |
| 8,820,046 B2 | 9/2014 | Ross et al. |
| 9,091,173 B2 | 7/2015 | Mosley et al. |
| 9,121,309 B2 | 9/2015 | Geiger |
| 9,151,176 B2 | 10/2015 | Chillar et al. |
| 9,764,846 B2 | 9/2017 | Bizzaro |
| 9,810,157 B2 | 11/2017 | Nichols et al. |
| 10,337,405 B2 | 7/2019 | Steen et al. |
| 10,427,632 B2 | 10/2019 | Jackowski et al. |
| 10,502,139 B2 | 12/2019 | Ross et al. |
| 10,947,993 B2 | 3/2021 | Shinde et al. |
| 11,047,306 B1 | 6/2021 | Millhaem et al. |
| 11,149,642 B2 | 10/2021 | Bayraktar et al. |
| 11,174,789 B2 | 11/2021 | Rambo et al. |
| 2001/0022933 A1 | 9/2001 | Bangert et al. |
| 2002/0173897 A1 | 11/2002 | Leamy et al. |
| 2006/0242962 A1* | 11/2006 | Johnson .............. F02K 3/10 60/761 |
| 2007/0031249 A1 | 2/2007 | Jones |
| 2008/0253922 A1 | 10/2008 | Trimmer et al. |
| 2009/0025365 A1 | 1/2009 | Schilling et al. |
| 2009/0301053 A1 | 12/2009 | Geiger |
| 2010/0189551 A1 | 7/2010 | Ballard, Jr. et al. |
| 2010/0329863 A1 | 12/2010 | Kray et al. |
| 2011/0027096 A1 | 2/2011 | Northfield |
| 2011/0049297 A1 | 3/2011 | Jevons et al. |
| 2011/0182741 A1 | 7/2011 | Alexander |
| 2011/0211967 A1 | 9/2011 | Deal et al. |
| 2011/0229334 A1 | 9/2011 | Alexander |
| 2011/0232294 A1 | 9/2011 | Ross et al. |
| 2012/0003100 A1 | 1/2012 | James et al. |
| 2012/0301292 A1 | 11/2012 | Deal et al. |
| 2012/0316748 A1 | 12/2012 | Jegu et al. |
| 2013/0034451 A1 | 2/2013 | Taniguchi et al. |
| 2013/0091850 A1 | 4/2013 | Francisco |
| 2014/0236451 A1 | 8/2014 | Gerez et al. |
| 2014/0373553 A1 | 12/2014 | Zaccaria et al. |
| 2015/0044022 A1 | 2/2015 | Bagni et al. |
| 2015/0047359 A1 | 2/2015 | Maguire et al. |
| 2015/0252729 A1 | 9/2015 | Niggemeier et al. |
| 2016/0001881 A1 | 1/2016 | van der Westhuizen |
| 2017/0191419 A1 | 7/2017 | Bayraktar et al. |
| 2017/0234166 A1 | 8/2017 | Dube et al. |
| 2017/0234447 A1 | 8/2017 | Jennings et al. |
| 2017/0335768 A1* | 11/2017 | Steen .................. F02C 9/00 |
| 2021/0262386 A1* | 8/2021 | Kalevi Makela ......... F02C 7/12 |

FOREIGN PATENT DOCUMENTS

| | | |
|---|---|---|
| EP | 2543851 A1 | 1/2013 |
| GB | 1435906 A | 5/1976 |
| GB | 2117842 A | 10/1983 |
| JP | H08210152 A | 8/1996 |
| JP | 2000314325 A | 11/2000 |

* cited by examiner

SYSTEM AND METHOD FOR MITIGATING BOWED ROTOR IN A GAS TURBINE ENGINE

FIELD

The present application claims priority to Indian Provisional Patent Application No. 202211020938 filed on Apr. 7, 2022.

FIELD

The present disclosure relates to gas turbine engines, and more particularly, to systems and methods for reducing, mitigating, or eliminating bowed rotor conditions in gas turbine engines.

BACKGROUND

Gas turbine engines, such as those providing propulsion for aircraft, generate heat at the rotor assemblies during operation. Following shutdown of the engine, the accumulated heat at the rotor assembly is asymmetrically or non-uniformly released such as to define a thermal gradient that induces distortion or bowing of the rotor assembly. Such bowing, referred to as rotor bow, thermal bowing, a bowed rotor start (BRS), or as defining a bowed rotor condition in the engine, creates eccentricity of the rotor assembly relative to an axial centerline axis and surrounding casings.

This bowed rotor condition further results in increased imbalance at the rotor assembly. Such unbalance and eccentricities may be particularly problematic if an engine is started with a bowed rotor, which may result in the rotor assembly making undesired contact at the surrounding casing, resulting in damage to the surrounding casing, the rotor assembly, or a bearing assembly. Such damage may result in engine failure or necessitate maintenance or overhaul of the engine, resulting in increased engine operating costs. In addition, engine operation with a bowed rotor may result in vibrations which may be felt in the airplane and engine performance losses.

Known solutions for alleviating a bowed rotor condition include resting the engine until the thermal gradient has naturally decreased over time. Other solutions include motoring (i.e., rotating the engine without combustion) the rotor assembly to reduce the thermal gradient, thereby reducing eccentricity of the rotor assembly relative to the surrounding casings. However, such solutions may include motoring the rotor assembly for relatively long periods that adversely affect an amount of time to start or re-start an engine following shutdown. Such relatively long periods adversely affect an ability of commercial engine operators (e.g., airlines) to load an aircraft and begin taxi and takeoff, as such, increasing operating costs of the engine and aircraft and undesirably affecting the end user.

Accordingly, improved systems and methods for addressing a bowed rotor condition in a gas turbine engine would be useful. More specifically, a system for quickly eliminating a bowed rotor condition with minimal engine downtime would be particularly beneficial.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
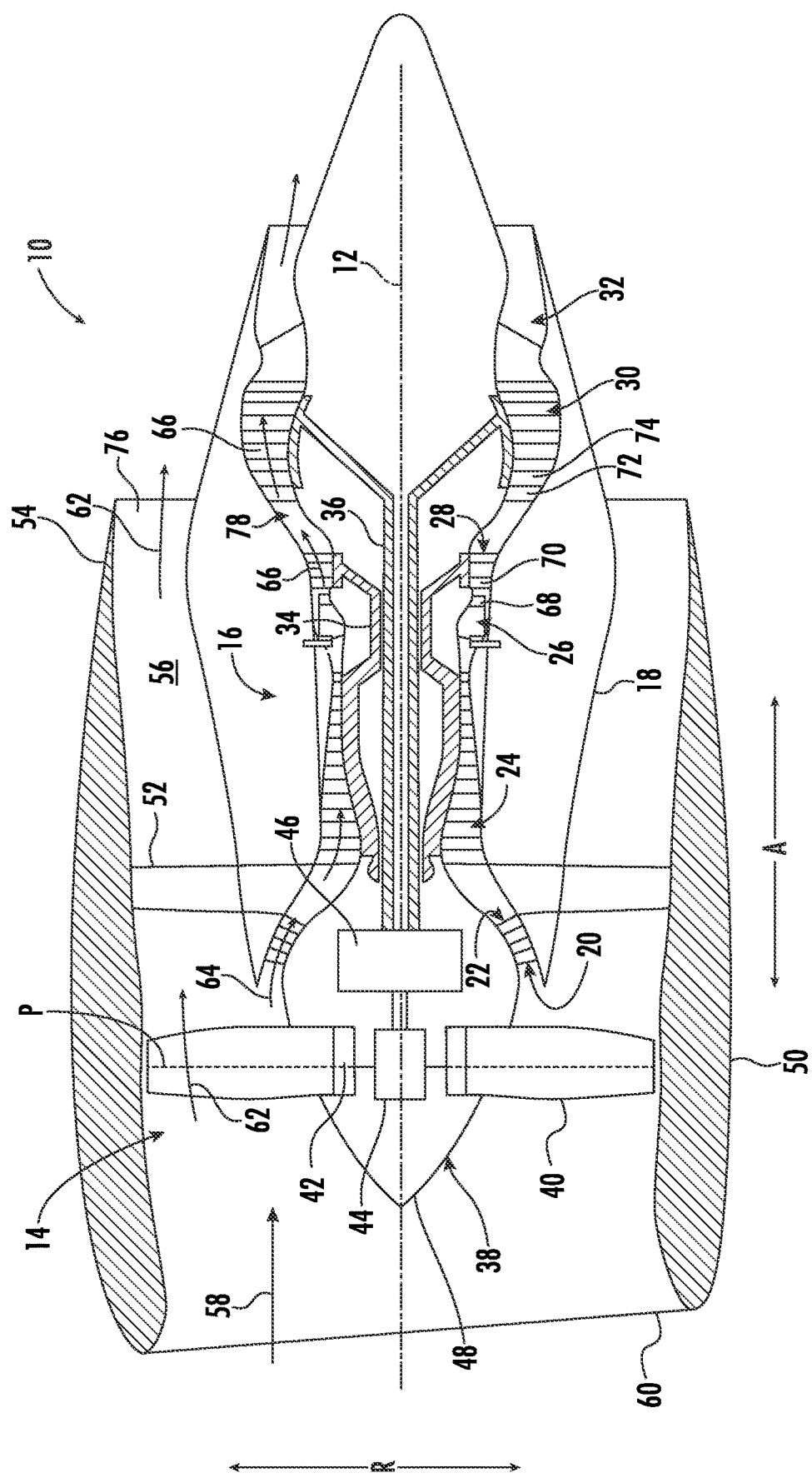
FIG. 1 is a schematic cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). The term "at least one of" in the context of, e.g., "at least one of A, B, and C" refers to only A, only B, only C, or any combination of A, B, and C. In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the disclosure, not limitation of the disclosure. In fact, it will be apparent to those skilled in the art that various modifications and variations can be made in the present disclosure without departing from the scope of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The present disclosure is generally related to a system and method for cooling a rotor assembly of a gas turbine engine during a shutdown phase of the engine, e.g., to reduce temperature gradients within the engine and mitigate bowed rotor conditions. In this regard, as explained above, gas turbine engines generate heat during operation, and asymmetric or non-uniform dissipation of the accumulated heat may result in thermal gradients in the rotor assembly that can result distortion or bowing of the rotor assembly. Such a bowed rotor can result in rotor imbalance and eccentricities that may result in the rotor assembly making undesired contact at with the casing, excessive vibrations and noise, etc.

The cooling system of the present disclosure may provide a flow of cooling fluid through the engine at desired locations, e.g., to facilitate heat dissipation and improved temperature uniformity within the rotor assembly. For example, the rotor assembly may include a forward rotor portion defining a forward rotor cavity and an aft rotor portion defining an aft rotor cavity, where these cavities are fluidly isolated from each other. The cooling system may include forward and aft supply lines that fluidly couple a cooling fluid supply to the forward and aft cavities, respectively, for providing flows of cooling fluid therethrough. A flow control system may be fluidly coupled to the forward and aft supply lines and may include a plurality of one-way valves and/or control valves for selectively regulating the flows of cooling fluid through the forward and aft rotors cavities during engine shutdown, e.g., when the engine speed drops below a predetermined threshold speed. These flows of cooling fluid may be supplied continuously into the rotor cavities until the rotor assembly has dropped to a suitably low temperature to reduce bowed rotor conditions.

Referring now to the drawings, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan engine 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustor or combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal centerline 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan engine 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated that the exemplary turbofan engine 10 depicted in FIG. 1 is by way of example only and that in other exemplary embodiments, turbofan engine 10 may have any other suitable configuration. For example, it should be appreciated that in other exemplary embodiments, turbofan engine 10 may instead be configured as any other suitable turbine engine, such as a turboprop engine, turbojet engine, internal combustion engine, etc.

Figure 2:
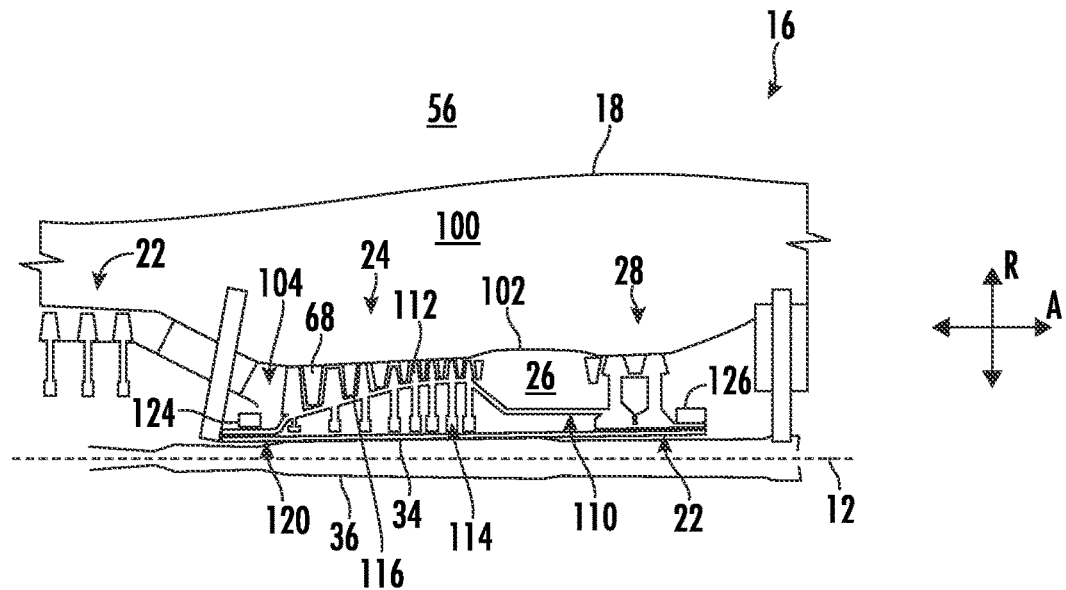
FIG. 2 is a schematic cross-sectional view of a core engine of the exemplary gas turbine engine of FIG. 1 in accordance with an exemplary aspect of the present disclosure.

Referring now for example to FIG. 2, a close-up, schematic, cross-sectional view of a portion of core turbine engine 16 is illustrated. As shown, outer casing 18 is a generally annular structure that defines an outer radial boundary of core turbine engine 16, containing most of all of the structure of core turbine engine 16. In addition, an outer radial surface of outer casing 18 may define an inner radial boundary of bypass airflow passage 56 in turbofan applications. Inside outer casing 18 is an under cowl area 100 of core turbine engine 16, where various operating components of the engine may be stored.

In addition, an inner casing 102 may be positioned inside outer casing 18 along the radial direction R and may define an outer radial boundary of a working gas flow path 104. More specifically, inner casing 102 may generally include compressor and turbine casings, e.g., casings surrounding LP compressor 22, HP compressor 24, HP turbine 28, and LP turbine 30 (see FIG. 1). As illustrated, stator vanes 68 extend from inner casing 102 inward along the radial direction R across the working gas flow path 104.

A rotor assembly 110 may be rotatably mounted within outer casing 18 and may define a plurality of rotor blades 112 that extend outward along the radial direction R from a rotor support frame 114. More specifically, an outer surface of rotor support frame 114 may define an inner radial boundary of working gas flow path 104 and rotor blades 112 may extend from rotor support frame 114 outward along the radial direction R into working gas flow path 104. Rotor blades 112 may be alternately positioned between stator vanes 68 to define a plurality of compressor or turbine stages, as described above. In addition, according to exemplary embodiments, rotor assembly 110 may include one or more connecting structures 116 which extend substantially along the axial direction to mechanically couple or connect adjacent rotor blades 112.

Referring still to FIG. 2, rotor support frame 114 and/or rotor blades 112 may be operably coupled to a driveshaft to facilitate rotation and operation of turbofan engine 10. In this regard, as explained above, core turbine engine 16 may include an LP shaft 36 that is operably coupled to LP compressor 22, LP turbine 30, and/or fan 38 (e.g., through power gearbox 46—see FIG. 1). In addition, core turbine engine 16 may include an HP shaft 34 that rotates independently of LP shaft 36 and is operably coupled to HP compressor 24 and HP turbine 28. For purposes of describing aspects of the present subject matter, the discussion below will focus on the portion of rotor assembly 110 associated with HP compressor 24. However, it should be appreciated that aspects of the present subject matter may be used on other portions of rotor assembly 110, such as, but not limited to, LP compressor 22, combustion section 26, HP turbine 28, and/or LP turbine 30.

As illustrated, HP shaft 34 includes a first supported end, e.g., a forward portion 120, and a second supported end, e.g., an aft portion 122, that are each coupled to a support bearing, e.g., a forward bearing 124 and an aft bearing 126, respectively. It should be appreciated that the bearing support configuration illustrated herein is only exemplary and is not intended to limit the scope of the subject matter in any manner. As explained above, during operation, core turbine engine 16 and rotor assembly 110 may generate a significant amount heat that may be dissipated unevenly during engine shutdown. This non-uniform or asymmetric cooling may result in a bowed rotor condition, which may be characterized by a displacement of rotor assembly 110 from a normal rotational centerline of rotor assembly (e.g., relative to longitudinal centerline 12).

As turbofan engine 10 is started for a subsequent operating cycle, a bowed rotor condition from the prior cycle that has not dissipated may cause excessive vibrations, loud noise, or even situations where rotor blades 112 contact or rub inner casing 102. Aspects of the present subject matter are directed to methods for facilitating improved cooling and a more uniform temperature distribution within rotor assembly 110 after a high temperature operating cycle, thereby mitigating or eliminating bowed rotor conditions.

Figure 3:
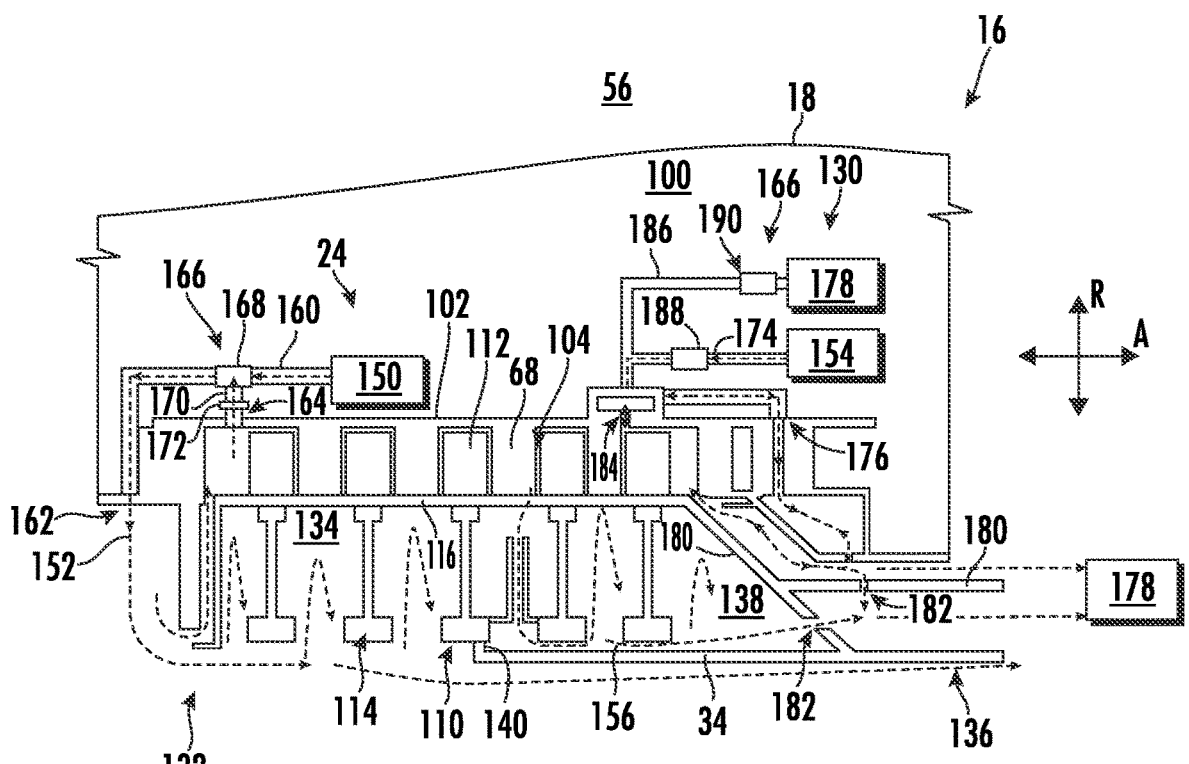
FIG. 3 is a schematic cross-sectional view of a core engine of the exemplary gas turbine engine of FIG. 1 including a rotor cooling assembly in accordance with an exemplary aspect of the present disclosure.

Referring now specifically to FIG. 3, an exemplary cooling system 130 that may be used to facilitate cooling of rotor assembly 110 will be described according to exemplary embodiments of the present subject matter. Specifically, cooling system 130 may be used to circulate a cooling fluid within core turbine engine 16 during a shutdown process of turbofan engine 10, e.g., to facilitate uniform temperatures within rotor assembly 110 and to reduce or eliminate the likelihood of a bowed rotor condition. Although an exemplary rotor configuration and cooling system configuration is described below for purposes of explanation, it should be appreciated that variations and modifications may be made to the system while remain within the scope of the present subject matter.

According to the illustrated embodiment, rotor assembly 110 is rotatably mounted within inner casing 102 to at least partially define working gas flow path 104 through which a working fluid passes during operation of turbofan engine 10. As illustrated, rotor assembly 110 may generally include a forward rotor portion 132 that defines a forward rotor cavity 134 and an aft rotor portion 136 that defines an aft rotor cavity 138. According to the exemplary embodiment, forward rotor portion 132 and aft rotor portion 136 are both part of HP compressor 24. However, it should be appreciated that these portions may refer to any other suitable regions of rotor assembly 110, such as portions of LP compressor 22 (FIG. 1), HP turbine 28 (FIG. 1), LP turbine 30 (FIG. 1), etc. In addition, forward rotor portion 132 and aft rotor portion 136 are both illustrated as being mechanically coupled to a driveshaft, e.g., HP shaft 34, which extends substantially along the axial direction A, e.g., along longitudinal centerline 12. However, it should be appreciated that HP shaft 34 may include different support structures and may be mechanically coupled in different manners while remaining within the scope present subject matter.

As best shown in FIG. 3, forward rotor cavity 134 is fluidly isolated from aft rotor cavity 138. In this regard, for example, fluid that is passed into forward rotor cavity 134 is generally blocked or prevented from flowing into aft rotor cavity 138, and vice versa. For example, rotor assembly 110 may include a variety of structures or components that generally prevent fluid communication between forward rotor cavity 134 and aft rotor cavity 138. In this regard, rotor assembly 110 may include one or more fluid seals, driveshafts or driveshaft extensions, frame members, radial walls, or any other internal components which generally block passage of fluid.

For example, according to an exemplary embodiment, rotor assembly 110 may further include one or more radial walls 140 that prevent fluid communication between these two cavities. For example, radial wall 140 is illustrated as extending from HP shaft 34 outward along the radial direction R to contact a third stage rotor blade 112. Such a connection may substantially seal aft rotor cavity 138 from forward rotor cavity 134. It should be appreciated that other structures within rotor assembly 110 may serve to prevent fluid flow between forward rotor cavity 134 and aft rotor cavity 138. In addition, it should be appreciated that the term "fluidly isolated" may refer to substantial fluid isolation, as some bleed flow may pass between cavities through working gas flow path 104 or other portions of core turbine engine 16. However, forward rotor cavity 134 and aft rotor cavity 138 are fluidly isolated to the extent that cooling fluid passed within one cavity would not be sufficient to facilitate cooling of the other cavity in a manner that mitigates bowed rotor conditions during a shutdown procedure.

Notably, having a rotor assembly with multiple fluidly isolated cavities may complicate the ability to supply a cooling fluid into rotor assembly 110 for cooling the entire rotor assembly 110. Accordingly, aspects of the present disclosure are directed to novel structures and methods for providing cooling flow at the desired flow rates, into the desired regions, and at the desired times to facilitate proper cooling of core turbine engine 16 during a shutdown process in order to prevent bowed rotor situations.

Referring still to FIG. 3, cooling system 130 may generally include a forward cooling fluid supply 150 that is configured for providing a flow of forward cooling fluid (indicated herein generally by reference numeral 152). Forward cooling fluid supply 150 may generally be any suitable source of cooling fluid. For example, forward cooling fluid supply 150 may include an external compressor or air pump, e.g., operated by battery power or any other suitable power source. Forward cooling fluid supply 150 may include a source of bleed air from any other suitable location within turbofan engine 10.

According to still other embodiments, for example, instead of urging fluid from an upstream, high pressure location, the flow of forward cooling fluid 152 and the flow of aft cooling fluid 156 (discussed below) may be motivated by extracting air form the forward rotor cavity 134 and/or the aft rotor cavity 138. In this regard, hot air may be extracted via an extraction/eductor pump which may be used to pump hot air out of rotor cavities 134, 138 such that relatively cool ambient air fills up these cavities 134, 138 to fill the vacuum created. Furthermore, it should be appreciated the fluid communication with rotor cavities 134, 138 may be achieved through any suitable aperture or port, e.g., defined through inner casing 102. In this regard, hot air extraction and/or cold air supply may be urged through rotor cavities 134, 138 using either existing borescope ports or new ports designed in the bottom half of inner casing (e.g., at the 3-6-9 o'clock for hot air extraction and 9-12-3 o'clock for cold air supply).

According to exemplary embodiments, forward cooling fluid supply 150 may include an air cycle machine (ACM) provided from an environmental control system (ECS) or thermal management system (TMS) of an aircraft. According to still other embodiments, forward cooling fluid supply 150 may be provided from a source external to turbofan engine 10, e.g., such as a fluid supply line available at an airport, a service truck, or other source. The flow of forward cooling fluid 152 may include air, inert gas, gas mixtures, water coolant, or any other suitable fluid or combinations thereof for cooling rotor assembly 110.

According to exemplary embodiments of the present subject matter, forward cooling fluid supply 150 may be located outward of working gas flow path 104 along the radial direction R. More specifically, according to the illustrated embodiment, forward cooling fluid supply 150 may be located within under cowl area 100, e.g., between outer casing 18 and inner casing 102 of the core turbine engine 16. In this manner, forward cooling fluid supply 150 may be securely mounted within under cowl area 100 while avoiding moving components of rotor assembly 110. It should be appreciated that other suitable locations of forward cooling fluid supply 150 are possible and within the scope of the present subject matter.

Notably, by having the source of the flow of forward cooling fluid 152 positioned outside of working gas flow path 104, cooling system 130 may include supply conduits and/or manifold configurations to facilitate movement of the flow of forward cooling fluid 152 into rotor assembly 110 and forward rotor cavity 134. Specifically, referring still to FIG. 3, cooling system 130 may include a forward supply line 160 that provides fluid communication between forward cooling fluid supply 150 and forward rotor cavity 134 for urging the flow of forward cooling fluid 152 through forward rotor cavity 134.

More specifically, according to the illustrated embodiment, inner casing 102 may define one or more forward supply ports 162 to which forward supply line 160 may be fluidly coupled, e.g., through one or more suitable fittings. In this manner, the flow of forward cooling fluid 152 may be directed into and across working gas flow path 104 into forward rotor cavity 134 to facilitate cooling therein. For example, the flow of forward cooling fluid 152 may circulate within forward rotor cavity 134 around rotor blades 112 positioned within forward rotor cavity 134, among connecting structure 116, along HP shaft 34, and over other portions of rotor assembly 110 to facilitate cooling. As illustrated, the flow of forward cooling fluid 152 may pass out of forward rotor cavity 134, e.g., through HP shaft 34 to exhaust out the back of turbofan engine 10.

According to the illustrated embodiment, a forward bleed port 164 may be defined in inner casing 102 and may be in fluid communication with forward rotor cavity 134 (e.g., via working gas flow path 104). During normal engine operation, forward bleed port 164 may be configured for passing bleed air out of forward rotor cavity 134, e.g., to other regions of turbofan engine 10, such as downstream to HP turbine 28 or LP turbine 30. Notably, however, it may be desirable to prevent the flow of forward cooling fluid 152 from seeping through forward bleed port 164, as this may reduce the cooling efficiency of cooling system 130. Accordingly, cooling system 130 may further include a flow control system 166 that is generally configured for regulating the flow of forward cooling fluid 152 and/or the flow of bleed air within forward rotor cavity 134. As used herein, the term "flow control system" may be used to generally refer to the system of control valves, check valves, plumbing, or other flow regulating devices that are intended to regulate the distribution of cooling fluid within cooling system 130.

Specifically, according to the illustrated embodiment, flow control system 166 may generally include a forward control valve 168 that is fluidly coupled to forward supply line 160 for regulating the flow of forward cooling fluid 152 passing through forward rotor cavity 134. In addition, according to the illustrated embodiment, a forward bleed line 170 may fluidly couple forward bleed port 164 to forward control valve 168. In this manner, forward control valve 168 may generally regulate the flow of forward cooling fluid 152 and the flow of bleed fluid. In addition, flow control system 166 may include a check valve 172 that is fluidly coupled to forward bleed line 170 to prevent backflow into working gas flow path 104 and/or forward rotor cavity 134.

Referring still to FIG. 3, portions of cooling system 130 that are configured for cooling aft rotor cavity 138 will now be described according to an exemplary embodiment of the present subject matter. Specifically, according to the illustrated embodiment, cooling system 130 may include an aft cooling fluid supply 154 that is configured for providing a flow of aft cooling fluid (indicated herein generally by reference numeral 156). Aft cooling fluid supply 154 may generally be any suitable source of cooling fluid. For example, aft cooling fluid supply 154 may be the same or similar to forward cooling fluid supply 150 or may be sourced from another location. In this regard, aft cooling fluid supply 154 may include an external compressor or air pump, e.g., operated by battery power or any other suitable power source. According to exemplary embodiments, aft cooling fluid supply 154 may include an air cycle machine (ACM) provided from an environmental control system (ECS) or thermal management system (TMS) of an aircraft. According to still other embodiments, aft cooling fluid supply 154 may be provided from a source external to turbofan engine 10, e.g., such as a fluid supply line available at an airport, a service truck, or other source. The flow of aft cooling fluid 156 may include air, inert gas, gas mixtures, water coolant, or any other suitable fluid or combinations thereof for cooling rotor assembly 110. It should be appreciated aft cooling fluid supply 154 may be the same or different than forward cooling fluid supply 150. In addition, aft cooling fluid supply 154 may be positioned or configured similar to or different than forward cooling fluid supply 150 while remaining within the scope of the present subject matter.

Figure 4:
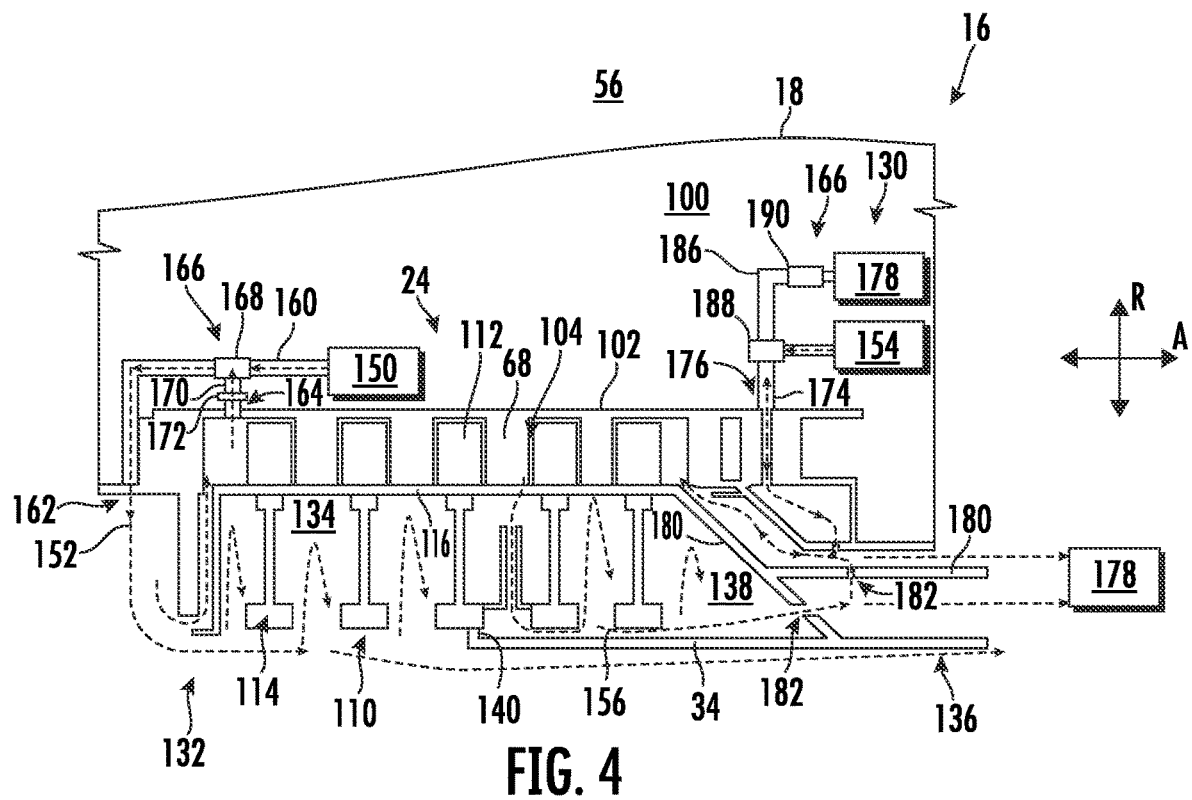
FIG. 4 is a schematic cross-sectional view of a core engine of the exemplary gas turbine engine of FIG. 1 including a rotor cooling assembly in accordance with another exemplary aspect of the present disclosure.

Referring generally to FIGS. 3 and 4, cooling system 130 may include an aft supply line 174 that provides fluid communication between aft cooling fluid supply 154 and aft rotor cavity 138 for urging a flow of aft cooling fluid 156 through aft rotor cavity 138.

More specifically, according to the illustrated embodiment, inner casing 102 may define one or more aft supply ports 176 to which aft supply line 174 may be fluidly coupled, e.g., through one or more suitable fittings. In this manner, the flow of aft cooling fluid 156 may be directed into and across working gas flow path 104 into aft rotor cavity 138 to facilitate cooling therein. For example, the flow of aft cooling fluid 156 may circulate within aft rotor cavity 138 around rotor blades 112 positioned within aft rotor cavity 138, among connecting structure 116, along HP shaft 34, and over other portions of rotor assembly 110 to facilitate cooling.

As illustrated, the flow of aft cooling fluid 156 may pass out of aft rotor cavity 138, e.g., as an auxiliary cooling supply (e.g., identified herein generally by reference numeral 178). In this regard, auxiliary cooling supply 178 may be sourced from one or more locations (e.g., two locations as illustrated in FIGS. 3 and 4) and may be used for other purposes within a turbofan engine 10, e.g., such as cooling downstream components of the core turbine engine 16, such as HP turbine 28 and/or LP turbine 30. In addition, or alternatively, auxiliary cooling supply 178 may be fluidly coupled to an exhaust stream or may be routed to any other suitable location within or around turbofan engine 10. In this regard, for example, the aft bleed air may be supplied to a turbine section of rotor assembly 110.

According to the illustrated embodiment, rotor assembly 110 may further include one or more shaft extension members 180 that extend from or are connected to HP shaft 34 to provide additional structure or connect other components of rotor assembly 110. In general, these shaft extension members 180 may serve to further fluidly isolate aft rotor cavity 138. Accordingly, one or more vent openings 182 may be defined through shaft extension members 180 to facilitate fluid communication between aft rotor cavity 138, aft supply port 176, auxiliary cooling supply 178, etc.

According to the illustrated embodiment, an aft bleed port 184 may be defined in inner casing 102 and may be in fluid communication with aft rotor cavity 138. For example, according to the illustrated embodiment, aft bleed port may be fluidly coupled to an aft bleed line 186 (which may be formed at least partially by aft supply line 174). Specifically, according to the illustrated embodiment, aft bleed line 186 and aft supply line 174 may be fluidly coupled or may otherwise form a manifold that may be in fluid communication with one or both of aft bleed port 184 and aft supply port 176. Accordingly, it should be appreciated that aft bleed port 184 and aft supply port 176 may both operate as bleed ports or cooling fluid supply ports depending on the operation of flow control system 166.

During normal engine operation, aft bleed port 184 may be configured for passing bleed air out of aft rotor cavity 138, e.g., to other regions of turbofan engine 10, such as downstream to HP turbine 28 or LP turbine 30. Notably, however, it may be desirable to prevent the flow of aft cooling fluid 156 from seeping through aft bleed line 186, as this may reduce the cooling efficiency of cooling system 130. Accordingly, flow control system 166 may be additionally configured for regulating the flow of aft cooling fluid 156 and/or the flow of bleed air through aft supply line 174 and the aft bleed line 186.

According to exemplary embodiments, flow control system 166 may generally include an aft control valve 188 that is fluidly coupled to aft supply line 174 for regulating the flow of aft cooling fluid 156 passing through aft rotor cavity 138. In addition, according to the illustrated embodiment, flow control system 166 may include a bleed control valve 190 that is fluidly coupled to aft bleed line 186 for regulating the flow of aft bleed air passing therethrough. Aft control valve 188 and bleed control valve 190 may selectively and independently operate to regulate the flow of aft cooling fluid 156 and the flow of bleed air within core turbine engine 16.

Now that the structure of cooling system has been described according to exemplary embodiments of the present subject matter, an exemplary method of operating cooling system 130 will be described according to exemplary embodiments of the present subject matter. It should be appreciated that the method described herein may be used to regulate other cooling systems and may be varied while remaining within scope the present subject matter. In general, turbofan engine 10 may include a controller that is generally configured for determining when turbofan engine 10 has entered a shutdown period. It should be appreciated that this determination may be made in any suitable manner and based on any suitable criteria. For example, the controller may determine that an engine is shutting down based on engine speed, aircraft speed, combustor operation, or any other suitable criteria. In addition, it should be appreciated that this shutdown process may continue for any suitable time period sufficient for mitigating any bowed rotor condition, such as a predetermined fixed amount of time, until the engine reaches a measured internal rotor temperature, etc.

Referring to the forward portion 120 of rotor assembly 110, after controller has determined that turbofan engine 10 has entered a shutdown phase, flow control system 166 may be regulated to control the flows of bleed air and cooling fluids 152, 156 passing through turbofan engine 10. Specifically, referring again to FIG. 3, during normal engine operation, forward control valve 168 may shut off the flow from forward cooling fluid supply 150. In this manner, the flow of forward cooling fluid 152 is not supplied into forward rotor cavity 134. However, the flow of forward bleed air may pass out forward bleed port 164, through forward biased check valve 172, through forward control valve 168, and back into forward supply line 160 for circulation within forward rotor cavity 134. During shutdown, forward control valve 168 may be opened to permit the flow of forward cooling fluid 152 to pass through forward supply line 160 and into forward rotor cavity 134, as described above.

Referring now to the aft portion 122 of rotor assembly 110, after controller has determined that turbofan engine 10 has entered a shutdown phase, bleed control valve 190 may be closed and aft control valve 188 may be opened. In this manner, the flow of aft cooling fluid 156 may pass from aft cooling fluid supply 154 into aft supply line 174. By closing bleed control valve 190, this the flow of aft cooling fluid 156 is not discharged downstream or to auxiliary cooling supply 178. Instead, the flow of aft cooling fluid 156 is directed through aft supply line 174, through aft supply port 176 and/or aft bleed port 184, and into aft rotor cavity 138.

It should be appreciated that the cooling system 130 described with respect to FIG. 3 is only exemplary and is not intended to limit the scope of the present subject matter in any manner. Indeed, variations and modifications may be made cooling system 130 while remaining within the scope of the present subject matter. For example, referring now briefly to FIG. 4, a modified version of cooling system 130 will be described according to an exemplary embodiment. Due to the similarity between embodiments, like reference numerals may be used to refer to the same or similar features.

Specifically, cooling system 130 of FIG. 4 is modified in that aft bleed port 184 may be removed, plugged, or otherwise not used for fluid flow during the shutdown process. In this regard, aft cooling fluid supply 154 and auxiliary cooling supply 178 may be fluidly coupled directly to aft supply port 176, e.g., directly through aft supply line 174 and aft bleed line 186, respectively. According to such an embodiment, aft control valve 188 and bleed control valve 190 may be used in conjunction to regulate the flow of bleed air and the flow of aft cooling fluid 156 in a manner similar to that described above. Other configurations are possible and within scope the present subject matter.

Figure 5:
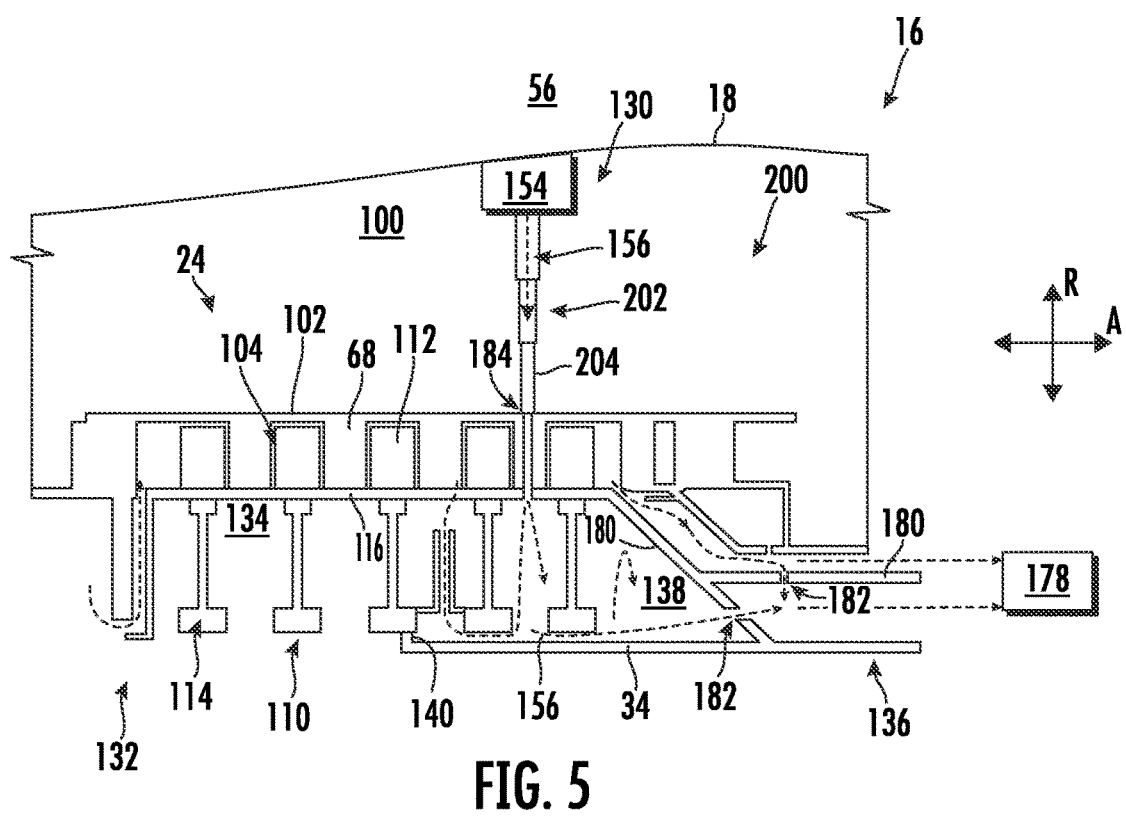
FIG. 5 is a schematic cross-sectional view of a core engine of the exemplary gas turbine engine of FIG. 1 including a rotor cooling assembly in accordance with another exemplary aspect of the present disclosure.

Referring now to FIG. 5, a cooling system 200 that may be used to cool rotor assembly 110 during a shutdown process will be described according to alternative embodiments of the present subject matter. Specifically, according to the illustrated exemplary embodiment, instead of having a system of valves, supply lines, and manifolds, the embodiment of cooling system 200 illustrated in FIG. 5 directly couples aft cooling fluid supply 154 through a bleed port (e.g., illustrated herein as aft bleed port 184) through a retractable fluid supply arm 202. In this regard, retractable fluid supply arm 202 may include a plurality of telescoping segments 204 that are extendable through aft bleed port 184 and directly into aft rotor cavity 138, e.g., through an aperture defined in connecting structure 116 of rotor assembly 110.

During normal operation of turbofan engine 10, retractable fluid supply arm 202 may be retracted such that is positioned entirely within under cowl area 100 and is not fluidly coupled to aft bleed port 184. By contrast, when turbofan engine 10 enters a shutdown phase, retractable fluid supply or 202 may be extended such that telescoping segments 204 extend to and through aft bleed port 184. Simultaneously, aft cooling fluid supply 154 may be activated (e.g., by starting a compressor pump) or a valve may otherwise be opened to provide the flow of aft cooling fluid 156 through retractable fluid supply arm 202 into aft rotor cavity 138. Although cooling system 200 is illustrated herein is only cooling aft rotor cavity 138, it should be appreciated that similar structures or retractable arms may be used to provide the flow of forward cooling fluid 152 to forward rotor cavity 134 or any other suitable cooling system may be used to cool this or other parts of rotor assembly 110.

Now that the construction of turbofan engine 10 and the configuration of cooling system 130 according to exemplary embodiments have been presented, an exemplary method 300 of operating a cooling system of a gas turbine engine will be described. Although the discussion below refers to the exemplary method 300 of operating cooling system 130, one skilled in the art will appreciate that the exemplary method 300 is applicable to the operation of a variety of other cooling systems.

Figure 6:
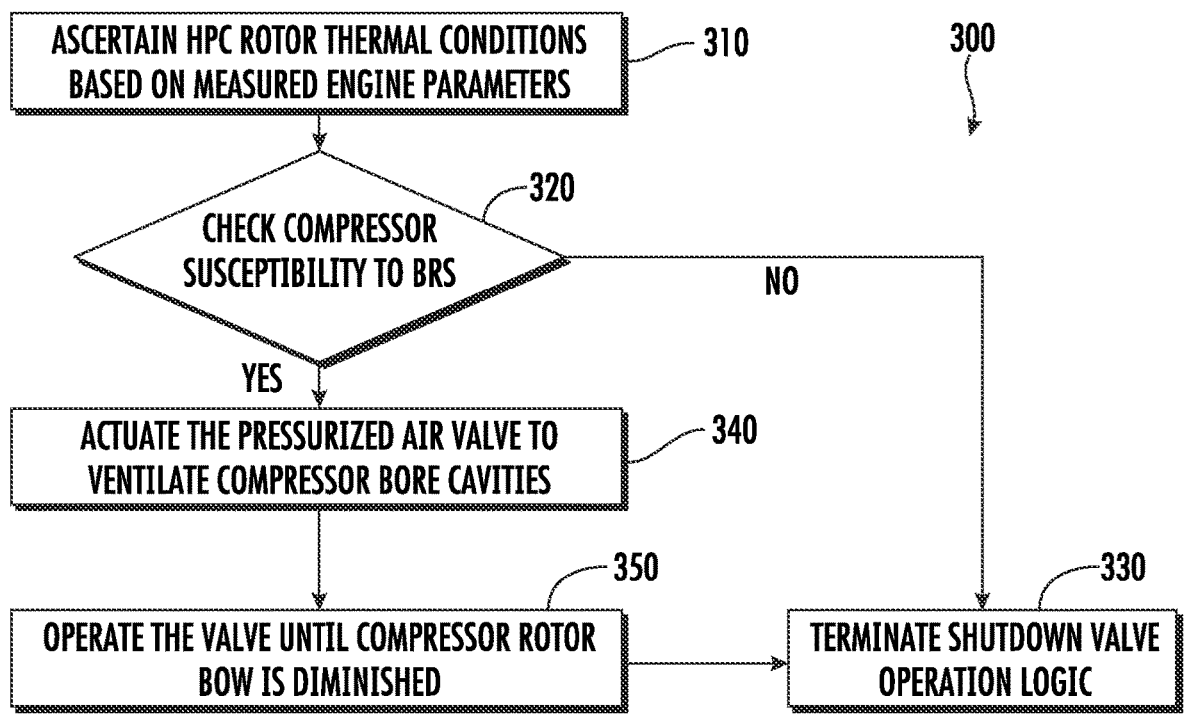
FIG. 6 illustrates a method for operating a rotor cooling assembly of a gas turbine engine in accordance with one embodiment of the present disclosure.

Referring now to FIG. 6, method 300 includes, at step 310, ascertaining the thermal conditions of a rotor assembly, such as the high pressure compressor (HPC), e.g., based on measured engine parameters. For example, the thermal conditions may be based on engine parameters such as an engine shutdown time, a thrust reverser operation, a power setting before thrust reverser operation (e.g., cruise or hold), an engine ground idle duration before shutdown, ambient conditions at the airport, or any other detectable parameters or conditions which may be indicative of the thermal conditions of a rotor assembly. Although method 300 is described herein with respect to the high pressure compressor, it should be appreciated that the method is equally applicable to the cooling of other portions engine or rotor assemblies, e.g., LPC, HPT, LPT, etc.

After the thermal conditions of the rotor assembly are determined, step 320 includes checking the susceptibility of the rotor assembly to a bowed rotor start (BRS) condition. For example, continuing the example from above, step 320 may include determining, based on the rotor thermal conditions, that the high pressure compressor is not likely to experience a bowed rotor start condition. In this situation, step 330 includes terminating the BRS shutdown logic and not operating the cooling system.

By contrast, if step 320 results in a determination that the rotor assembly may experience a bowed rotor start condition, step 340 may include actuating the pressurized air valve to ventilate compressor bore cavities. In this regard, continuing the example from above, step 340 may include operating the cooling system to provide cooling air into the rotor cavities in a manner suitable for reducing the thermal load within the rotor assembly and mitigating the bowed rotor conditions. Specifically, step 340 may include regulating a flow control system of the cooling system to selectively regulate the flows of cooling fluid into the various cavities of the high pressure compressor or another rotor assembly. Step 350 may include maintaining operation of the pressurized air valve until the BRS condition is diminished or mitigated. For example, step 350 may include operating the rotor cooling system until the bowed rotor conditions are reduced or mitigated. After the BRS condition is diminished, method 300 may proceed to step 330, where the BRS shutdown logic is terminated.

FIG. 6 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 300 are explained using cooling system 130 and turbofan engine 10 as an example, it should be appreciated that this method may be applied to the operation of any suitable cooling system for any suitable gas turbine engine.

As explained above, aspects of the present subject matter are directed to methods for facilitating improved cooling and a more uniform temperature distribution within rotor assembly 110 after a high temperature operating cycle, thereby mitigating or eliminating bowed rotor conditions. The systems and methods described herein facilitate effective dissipation of heat in a uniform manner to ensure symmetric cooling and a reduced likelihood of a bowed rotor condition. In addition, this system of cooling minimizes engine downtime, reduces engine start time, reduces vibrations and loud noise, decreases the potential for blade rubbing, etc.

Further aspects are provided by the subject matter of the following clauses:

A gas turbine engine defining an axial direction and a radial direction extending perpendicular from the axial direction, the gas turbine engine comprising: a casing; a rotor assembly rotatably mounted within the casing, the rotor assembly comprising a forward rotor portion defining a forward rotor cavity and an aft rotor portion defining an aft rotor cavity, the aft rotor cavity being fluidly isolated from the forward rotor cavity; and a cooling system comprising: a forward cooling fluid supply; a forward supply line providing fluid communication between the forward cooling fluid supply and the forward rotor cavity for urging a flow of forward cooling fluid through the forward rotor cavity; an aft cooling fluid supply; an aft supply line providing fluid communication between the aft cooling fluid supply and the aft rotor cavity for urging a flow of aft cooling fluid through the aft rotor cavity; and a flow control system fluidly coupled to the forward supply line and the aft supply line for regulating the flow of forward cooling fluid and the flow of aft cooling fluid.

The gas turbine engine of any preceding clause, further comprising: a forward bleed port defined in the casing and being in fluid communication with the forward rotor cavity; and a forward bleed line fluidly coupled to the forward bleed port for receiving a flow of forward bleed air from the forward rotor cavity.

The gas turbine engine of any preceding clause, wherein the flow control system comprises: a check valve fluidly coupled to the forward bleed line to prevent backflow into the forward rotor cavity.

The gas turbine engine of any preceding clause, wherein the flow control system comprises: a forward control valve fluidly coupled to the forward supply line and the forward bleed line for selectively providing the flow of forward bleed air or the flow of forward cooling fluid through the forward rotor cavity.

The gas turbine engine of any preceding clause, further comprising a controller operably coupled to the flow control system, the controller being configured to: determine that the gas turbine engine has entered a shutdown period; and open the forward control valve to urge the flow of forward cooling fluid through the forward rotor cavity.

The gas turbine engine of any preceding clause, further comprising: an aft bleed port defined in the casing and being in fluid communication with the aft rotor cavity; and an aft bleed line fluidly coupled to the aft bleed port for receiving a flow of aft bleed air from the aft rotor cavity, wherein the flow control system comprises a bleed control valve fluidly coupled to the aft bleed line for regulating a flow of aft bleed air.

The gas turbine engine of any preceding clause, wherein the aft bleed line is fluidly coupled to a turbine section of the rotor assembly for providing the flow of aft bleed air into the turbine section.

The gas turbine engine of any preceding clause, wherein the aft supply line is fluidly coupled to the aft bleed port, and wherein the flow control system further comprises: an aft control valve fluidly coupled to the aft supply line for regulating the flow of aft cooling fluid through the aft supply line and through the aft rotor cavity.

The gas turbine engine of any preceding clause, further comprising a controller operably coupled to the flow control system, the controller being configured to: determine that the gas turbine engine has entered a shutdown period; and close the bleed control valve and open the aft control valve to urge the flow of aft cooling fluid through the aft rotor cavity.

The gas turbine engine of any preceding clause, further comprising: an aft bleed port defined in the casing and being in fluid communication with the aft rotor cavity; and a retractable fluid supply arm fluidly coupled to the aft cooling fluid supply and being movable between a retracted position and an extended position, wherein the retractable fluid supply arm is fluidly coupled to the aft bleed port in the extended position for urging the flow of aft cooling fluid through the aft rotor cavity.

The gas turbine engine of any preceding clause, further comprising a controller operably coupled to the retractable fluid supply arm, the controller being configured to: determine that the gas turbine engine has entered a shutdown period; and extend the retractable fluid supply arm to provide the flow of aft cooling fluid through the aft rotor cavity.

The gas turbine engine of any preceding clause, wherein a core engine flow path is defined between the rotor assembly and the casing along the radial direction, and wherein the forward rotor cavity and the aft rotor cavity are defined at least partially inside the core engine flow path along the radial direction.

The gas turbine engine of any preceding clause, wherein the forward rotor cavity is fluidly isolated from the aft rotor cavity by at least one of a fluid seal, a driveshaft, or a radial wall.

The gas turbine engine of any preceding clause, wherein the forward cooling fluid supply and the aft cooling fluid supply comprise an air pump or compressor.

The gas turbine engine of any preceding clause, wherein the forward rotor portion and the aft rotor portion are within a high pressure compressor of the gas turbine engine.

The gas turbine engine of any preceding clause, further comprising: a forward bearing for rotatably supporting a forward end of the rotor assembly, the forward end being positioned adjacent to and upstream of the forward rotor cavity; and an aft bearing for rotatably supporting an aft end of the rotor assembly, the aft end being positioned adjacent to and downstream of the aft rotor cavity.

The gas turbine engine of any preceding clause, wherein the rotor assembly further comprises: a driveshaft extended along the axial direction, wherein the forward rotor portion and the aft rotor portion are mechanically coupled to the driveshaft.

A cooling system for a gas turbine engine, the gas turbine engine comprising a casing and a rotor assembly rotatably mounted within the casing, the rotor assembly comprising a forward rotor portion defining a forward rotor cavity and an aft rotor portion defining an aft rotor cavity, the aft rotor cavity being fluidly isolated from the forward rotor cavity. The cooling system comprises: a forward cooling fluid supply; a forward supply line providing fluid communication between the forward fluid supply and the forward rotor cavity for urging a flow of forward cooling fluid through the forward rotor cavity; an aft cooling fluid supply; an aft supply line providing fluid communication between the aft cooling fluid supply and the aft rotor cavity for urging a flow of aft cooling fluid through the aft rotor cavity; and a flow control system fluidly coupled to the forward supply line and the aft supply line for regulating the flow of forward cooling fluid and the flow of aft cooling fluid.

The cooling system of any preceding clause, further comprising: a forward bleed port defined in the casing and being in fluid communication with the forward rotor cavity; a forward bleed line fluidly coupled to the forward bleed port for receiving a flow of forward bleed air from the forward rotor cavity; an aft bleed port defined in the casing and being in fluid communication with the aft rotor cavity; and an aft bleed line fluidly coupled to the aft bleed port for receiving a flow of aft bleed air from the aft rotor cavity, wherein the flow control system comprises a bleed control valve fluidly coupled to the aft bleed line for regulating a flow of aft bleed air, wherein the aft supply line is fluidly coupled to the aft bleed port, wherein the flow control system further comprises: a check valve fluidly coupled to the forward bleed line to prevent backflow into the forward rotor cavity; a forward control valve fluidly coupling the forward bleed line to the forward supply line and selectively providing the flow of forward bleed air or the flow of forward cooling fluid through the forward rotor cavity; and an aft control valve fluidly coupled to the aft supply line for regulating the flow of aft cooling fluid through the aft supply line and through the aft rotor cavity.

The cooling system of any preceding clause, further comprising: a forward bleed port defined in the casing and being in fluid communication with the forward rotor cavity; and a forward bleed line fluidly coupled to the forward bleed port for receiving a flow of forward bleed air from the forward rotor cavity.

The cooling system of any preceding clause, wherein the flow control system comprises: a check valve fluidly coupled to the forward bleed line to prevent backflow into the forward rotor cavity.

The cooling system of any preceding clause, wherein the flow control system comprises: a forward control valve fluidly coupled to the forward supply line and the forward bleed line for selectively providing the flow of forward bleed air or the flow of forward cooling fluid through the forward rotor cavity.

The cooling system of any preceding clause, further comprising a controller operably coupled to the flow control system, the controller being configured to: determine that the gas turbine engine has entered a shutdown period; and open the forward control valve to urge the flow of forward cooling fluid through the forward rotor cavity.

The cooling system of any preceding clause, further comprising: an aft bleed port defined in the casing and being in fluid communication with the aft rotor cavity; and an aft bleed line fluidly coupled to the aft bleed port for receiving a flow of aft bleed air from the aft rotor cavity, wherein the flow control system comprises a bleed control valve fluidly coupled to the aft bleed line for regulating a flow of aft bleed air.

The cooling system of any preceding clause, wherein the aft bleed line is fluidly coupled to a turbine section of the rotor assembly for providing the flow of aft bleed air into the turbine section.

The cooling system of any preceding clause, wherein the aft supply line is fluidly coupled to the aft bleed port, and wherein the flow control system further comprises: an aft control valve fluidly coupled to the aft supply line for regulating the flow of aft cooling fluid through the aft supply line and through the aft rotor cavity.

The cooling system of any preceding clause, further comprising a controller operably coupled to the flow control system, the controller being configured to: determine that the gas turbine engine has entered a shutdown period; and close the bleed control valve and open the aft control valve to urge the flow of aft cooling fluid through the aft rotor cavity.

The cooling system of any preceding clause, further comprising: an aft bleed port defined in the casing and being in fluid communication with the aft rotor cavity; and a retractable fluid supply arm fluidly coupled to the aft cooling fluid supply and being movable between a retracted position and an extended position, wherein the retractable fluid supply arm is fluidly coupled to the aft bleed port in the extended position for urging the flow of aft cooling fluid through the aft rotor cavity.

The cooling system of any preceding clause, further comprising a controller operably coupled to the retractable fluid supply arm, the controller being configured to: determine that the gas turbine engine has entered a shutdown period; and extend the retractable fluid supply arm to provide the flow of aft cooling fluid through the aft rotor cavity.

The cooling system of any preceding clause, wherein a core engine flow path is defined between the rotor assembly and the casing along the radial direction, and wherein the forward rotor cavity and the aft rotor cavity are defined at least partially inside the core engine flow path along the radial direction.

The cooling system of any preceding clause, wherein the forward rotor cavity is fluidly isolated from the aft rotor cavity by at least one of a fluid seal, a driveshaft, or a radial wall.

The cooling system of any preceding clause, wherein the forward cooling fluid supply and the aft cooling fluid supply comprise an air pump or compressor.

The cooling system of any preceding clause, wherein the forward rotor portion and the aft rotor portion are within a high pressure compressor of the gas turbine engine.

The cooling system of any preceding clause, further comprising: a forward bearing for rotatably supporting a forward end of the rotor assembly, the forward end being positioned adjacent to and upstream of the forward rotor cavity; and an aft bearing for rotatably supporting an aft end of the rotor assembly, the aft end being positioned adjacent to and downstream of the aft rotor cavity.

The cooling system of any preceding clause, wherein the rotor assembly further comprises: a driveshaft extended along the axial direction, wherein the forward rotor portion and the aft rotor portion are mechanically coupled to the driveshaft.

A gas turbine engine defining an axial direction and a radial direction extending perpendicular from the axial direction, the gas turbine engine comprising: a turbomachine defining a working gas flow path and comprising a rotor assembly, the rotor assembly comprising a forward rotor portion defining a forward rotor cavity and an aft rotor portion defining an aft rotor cavity, the aft rotor cavity being fluidly isolated from the forward rotor cavity; and a cooling system. The cooling system comprises: a cooling fluid supply located outward of the working gas flow path; a forward supply line providing fluid communication between the cooling fluid supply and the forward rotor cavity across the working gas flow path; and a flow control system fluidly coupled to the forward supply line for providing a flow of forward cooling fluid to the forward rotor cavity from the cooling fluid supply through the forward supply line during a shutdown period of the gas turbine engine.

The gas turbine engine of any preceding clause, further comprising: a forward bleed port defined in the casing and being in fluid communication with the forward rotor cavity; and a forward bleed line fluidly coupled to the forward bleed port for receiving a flow of forward bleed air from the forward rotor cavity.

The gas turbine engine of any preceding clause, wherein the flow control system comprises: a check valve fluidly coupled to the forward bleed line to prevent backflow into the forward rotor cavity.

The gas turbine engine of any preceding clause, wherein the flow control system comprises: a forward control valve fluidly coupled to the forward supply line and the forward bleed line for selectively providing the flow of forward bleed air or the flow of forward cooling fluid through the forward rotor cavity.

The gas turbine engine of any preceding clause, further comprising a controller operably coupled to the flow control system, the controller being configured to: determine that the gas turbine engine has entered a shutdown period; and open the forward control valve to urge the flow of forward cooling fluid through the forward rotor cavity.

The gas turbine engine of any preceding clause, wherein the cooling system further comprises: an aft cooling fluid supply located outward of the working gas flow path; an aft supply line providing fluid communication between the aft fluid supply and the aft rotor cavity across the working gas flow path; and a flow control system fluidly coupled to the aft supply line for providing a flow of aft cooling fluid to the aft rotor cavity from the aft cooling fluid supply through the aft supply line during a shutdown period of the gas turbine engine.

The gas turbine engine of any preceding clause, further comprising: an aft bleed port defined in the casing and being in fluid communication with the aft rotor cavity; and an aft bleed line fluidly coupled to the aft bleed port for receiving a flow of aft bleed air from the aft rotor cavity, wherein the flow control system comprises a bleed control valve fluidly coupled to the aft bleed line for regulating a flow of aft bleed air.

The gas turbine engine of any preceding clause, wherein the aft bleed line is fluidly coupled to a turbine section of the rotor assembly for providing the flow of aft bleed air into the turbine section.

The gas turbine engine of any preceding clause, wherein the aft supply line is fluidly coupled to the aft bleed port, and wherein the flow control system further comprises: an aft control valve fluidly coupled to the aft supply line for regulating the flow of aft cooling fluid through the aft supply line and through the aft rotor cavity.

The gas turbine engine of any preceding clause, further comprising a controller operably coupled to the flow control system, the controller being configured to: determine that the gas turbine engine has entered a shutdown period; and close the bleed control valve and open the aft control valve to urge the flow of aft cooling fluid through the aft rotor cavity.

The gas turbine engine of any preceding clause, further comprising: an aft bleed port defined in the casing and being in fluid communication with the aft rotor cavity; and a retractable fluid supply arm fluidly coupled to the aft cooling fluid supply and being movable between a retracted position and an extended position, wherein the retractable fluid supply arm is fluidly coupled to the aft bleed port in the extended position for urging the flow of aft cooling fluid through the aft rotor cavity.

The gas turbine engine of any preceding clause, further comprising a controller operably coupled to the retractable fluid supply arm, the controller being configured to: determine that the gas turbine engine has entered a shutdown period; and extend the retractable fluid supply arm to provide the flow of aft cooling fluid through the aft rotor cavity.

The gas turbine engine of any preceding clause, wherein the forward rotor cavity is fluidly isolated from the aft rotor cavity by at least one of a fluid seal, a driveshaft, or a radial wall.

The gas turbine engine of any preceding clause, wherein the forward cooling fluid supply and the aft cooling fluid supply comprise an air pump or compressor.

The gas turbine engine of any preceding clause, wherein the forward rotor portion and the aft rotor portion are within a high pressure compressor of the gas turbine engine.

The gas turbine engine of any preceding clause, further comprising: a forward bearing for rotatably supporting a forward end of the rotor assembly, the forward end being positioned adjacent to and upstream of the forward rotor cavity; and an aft bearing for rotatably supporting an aft end of the rotor assembly, the aft end being positioned adjacent to and downstream of the aft rotor cavity.

The gas turbine engine of any preceding clause, wherein the rotor assembly further comprises: a driveshaft extended along the axial direction, wherein the forward rotor portion and the aft rotor portion are mechanically coupled to the driveshaft.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A gas turbine engine defining an axial direction and a radial direction extending perpendicular from the axial direction, the gas turbine engine comprising:
   a casing;
   a rotor assembly rotatably mounted within the casing, the rotor assembly comprising a forward rotor portion defining a forward rotor cavity and an aft rotor portion defining an aft rotor cavity, the aft rotor cavity being fluidly isolated from the forward rotor cavity, wherein the forward rotor portion and the aft rotor portion are within a compressor of the gas turbine engine; and
   a cooling system comprising:
      a forward cooling fluid supply;
      a forward supply line providing fluid communication between the forward cooling fluid supply and the forward rotor cavity for urging a flow of forward cooling fluid through the forward rotor cavity;
      an aft cooling fluid supply;
      an aft supply line providing fluid communication between the aft cooling fluid supply and the aft rotor cavity for urging a flow of aft cooling fluid through the aft rotor cavity; and
      a flow control system fluidly coupled to the forward supply line and the aft supply line for regulating the flow of forward cooling fluid and the flow of aft cooling fluid.

2. The gas turbine engine of claim 1, further comprising:
   a forward bleed port defined in the casing and being in fluid communication with the forward rotor cavity; and
   a forward bleed line fluidly coupled to the forward bleed port for receiving a flow of forward bleed air from the forward rotor cavity.

3. The gas turbine engine of claim 2, wherein the flow control system comprises:
   a check valve fluidly coupled to the forward bleed line to prevent backflow into the forward rotor cavity.

4. The gas turbine engine of claim 2, wherein the flow control system comprises:
   a forward control valve fluidly coupled to the forward supply line and the forward bleed line for selectively providing the flow of forward bleed air or the flow of forward cooling fluid through the forward rotor cavity.

5. The gas turbine engine of claim 4, further comprising a controller operably coupled to the flow control system, the controller being configured to:
   determine that the gas turbine engine has entered a shutdown period; and
   open the forward control valve to urge the flow of forward cooling fluid through the forward rotor cavity.

6. The gas turbine engine of claim 1, further comprising:
   an aft bleed port defined in the casing and being in fluid communication with the aft rotor cavity; and
   an aft bleed line fluidly coupled to the aft bleed port for receiving a flow of aft bleed air from the aft rotor cavity, wherein the flow control system comprises a bleed control valve fluidly coupled to the aft bleed line for regulating a flow of aft bleed air.

7. The gas turbine engine of claim 6, wherein the aft bleed line is fluidly coupled to a turbine section of the rotor assembly for providing the flow of aft bleed air into the turbine section.

8. The gas turbine engine of claim 6, wherein the aft supply line is fluidly coupled to the aft bleed port, and wherein the flow control system further comprises:
   an aft control valve fluidly coupled to the aft supply line for regulating the flow of aft cooling fluid through the aft supply line and through the aft rotor cavity.

9. The gas turbine engine of claim 8, further comprising a controller operably coupled to the flow control system, the controller being configured to:
   determine that the gas turbine engine has entered a shutdown period; and
   close the bleed control valve and open the aft control valve to urge the flow of aft cooling fluid through the aft rotor cavity.

10. The gas turbine engine of claim 1, further comprising:
    an aft bleed port defined in the casing and being in fluid communication with the aft rotor cavity; and
    a retractable fluid supply arm fluidly coupled to the aft cooling fluid supply and being movable between a retracted position and an extended position, wherein the retractable fluid supply arm is fluidly coupled to the aft bleed port in the extended position for urging the flow of aft cooling fluid through the aft rotor cavity.

11. The gas turbine engine of claim 10, further comprising a controller operably coupled to the retractable fluid supply arm, the controller being configured to:
    determine that the gas turbine engine has entered a shutdown period; and
    extend the retractable fluid supply arm to provide the flow of aft cooling fluid through the aft rotor cavity.

12. The gas turbine engine of claim 1, wherein a core engine flow path is defined between the rotor assembly and the casing along the radial direction, and wherein the forward rotor cavity and the aft rotor cavity are defined at least partially inside the core engine flow path along the radial direction.

13. The gas turbine engine of claim 1, wherein the forward rotor cavity is fluidly isolated from the aft rotor cavity by at least one of a fluid seal, a driveshaft, or a radial wall.

14. The gas turbine engine of claim 1, wherein the forward cooling fluid supply and the aft cooling fluid supply comprise an air pump or compressor.

15. The gas turbine engine of claim 1, further comprising:
    a forward bearing for rotatably supporting a forward end of the rotor assembly, the forward end being positioned adjacent to and upstream of the forward rotor cavity; and
    an aft bearing for rotatably supporting an aft end of the rotor assembly, the aft end being positioned adjacent to and downstream of the aft rotor cavity.

16. The gas turbine engine of claim 1, wherein the rotor assembly further comprises:
    a driveshaft extended along the axial direction, wherein the forward rotor portion and the aft rotor portion are mechanically coupled to the driveshaft.

17. A cooling system for a gas turbine engine, the gas turbine engine comprising a casing and a rotor assembly rotatably mounted within the casing, the rotor assembly comprising a forward rotor portion defining a forward rotor cavity and an aft rotor portion defining an aft rotor cavity, wherein the forward rotor portion and the aft rotor portion are within a compressor of the gas turbine engine, the aft rotor cavity being fluidly isolated from the forward rotor cavity, the cooling system comprising:
- a forward cooling fluid supply;
- a forward supply line providing fluid communication between the forward cooling fluid supply and the forward rotor cavity for urging a flow of forward cooling fluid through the forward rotor cavity;
- an aft cooling fluid supply;
- an aft supply line providing fluid communication between the aft cooling fluid supply and the aft rotor cavity for urging a flow of aft cooling fluid through the aft rotor cavity; and
- a flow control system fluidly coupled to the forward supply line and the aft supply line for regulating the flow of forward cooling fluid and the flow of aft cooling fluid.

18. The cooling system of claim 17, further comprising:
- a forward bleed port defined in the casing and being in fluid communication with the forward rotor cavity;
- a forward bleed line fluidly coupled to the forward bleed port for receiving a flow of forward bleed air from the forward rotor cavity;
- an aft bleed port defined in the casing and being in fluid communication with the aft rotor cavity; and
- an aft bleed line fluidly coupled to the aft bleed port for receiving a flow of aft bleed air from the aft rotor cavity, wherein the flow control system comprises a bleed control valve fluidly coupled to the aft bleed line for regulating a flow of aft bleed air, wherein the aft supply line is fluidly coupled to the aft bleed port, wherein the flow control system further comprises:
  - a check valve fluidly coupled to the forward bleed line to prevent backflow into the forward rotor cavity;
  - a forward control valve fluidly coupling the forward bleed line to the forward supply line and selectively providing the flow of forward bleed air or the flow of forward cooling fluid through the forward rotor cavity; and
  - an aft control valve fluidly coupled to the aft supply line for regulating the flow of aft cooling fluid through the aft supply line and through the aft rotor cavity.

19. A gas turbine engine defining an axial direction and a radial direction extending perpendicular from the axial direction, the gas turbine engine comprising:
- a casing;
- a rotor assembly rotatably mounted within the casing, the rotor assembly comprising a forward rotor portion defining a forward rotor cavity and an aft rotor portion defining an aft rotor cavity, the aft rotor cavity being fluidly isolated from the forward rotor cavity; and
- a cooling system comprising:
  - a forward cooling fluid supply;
  - a forward supply line providing fluid communication between the forward cooling fluid supply and the forward rotor cavity for urging a flow of forward cooling fluid through the forward rotor cavity;
  - an aft cooling fluid supply;
  - an aft supply line providing fluid communication between the aft cooling fluid supply and the aft rotor cavity for urging a flow of aft cooling fluid through the aft rotor cavity; and
  - a flow control system fluidly coupled to the forward supply line and the aft supply line for regulating the flow of forward cooling fluid and the flow of aft cooling fluid;
- an aft bleed port defined in the casing and being in fluid communication with the aft rotor cavity;
- an aft bleed line fluidly coupled to the aft bleed port for receiving a flow of aft bleed air from the aft rotor cavity, wherein the flow control system comprises a bleed control valve fluidly coupled to the aft bleed line for regulating a flow of aft bleed air,
- wherein the aft supply line is fluidly coupled to the aft bleed port, and wherein the flow control system further comprises an aft control valve fluidly coupled to the aft supply line for regulating the flow of aft cooling fluid through the aft supply line and through the aft rotor cavity.

* * * * *